Sept. 25, 1962   G. E. SMITH ETAL   3,055,550
SPIRAL CONVEYORS
Original Filed June 15, 1959

Inventors
GEORGE E. SMITH
RICHARD CHANTLER

By *Smith + Smiley*
Attorneys 3,055,550
SPIRAL CONVEYORS
George Egerton Smith and Richard Chantler, Galleywood End, Chelmsford, England, assignors to Egerton Smith Engineers Limited, Chelmsford, England, a company of Great Britain
Original application June 15, 1959, Ser. No. 820,368. Divided and this application June 21, 1960, Ser. No. 37,752
Claims priority, application Great Britain June 20, 1958
4 Claims. (Cl. 222—52)

This invention relates to spiral feed conveyors more particularly to such conveyors for feeding pulverulent material suspended in liquid.

The invention is particularly applicable to the drive of an Archimedean spiral conveyor for feeding a mixture of a pulverulent material carrier in a liquid, e.g. sand in water, through a nozzle. In such spiral conveyor mechanisms the shaft of the spiral, which rotates in a conveyor housing fed by a hopper, is driven from a prime mover such as an electric motor and it is frequently necessary for the feed to be constantly watched and the speed of drive adjusted to ensure that the spiral conveyor is not overloaded and that the flow of material fed is maintained at a desired rate.

This application is divided out of United States Serial No. 820,368 which discloses control devices for machines and mechanisms having a member responsive to a predetermined load on the machines or mechanisms so as to actuate a device for recording the load or to initiate variation of the operation of the machine or mechanism responsive to the load thereon. By a "recording device" is meant a device, apparatus or instrument which will record the strain in the strainable member and hence the load on the machine or mechanism being controlled, or a device or apparatus which when the strainable member is strained to one or more predetermined values will cause actuation of means to stop the power input to the machine or drive mechanism being controlled or the output load thereon, or modify or reverse the power input thereto or the output load thereon.

The control device of United States Serial No. 820,368 comprises at least one twistable bar element having a portion fixable against rotation about its longitudinal axis and, spaced along said axis from the fixed portion, a portion operatively connected to a displaceable element of the mechanism which is capable of relative movement with respect to a part of the mechanism movable under load, the bar element being calibrated to restrain movement of the displaceable element when the loadable part of the mechanism is loaded within at least one predetermined limit, but when said load exceeds said limit will twist thereby permitting relative movement directly proportional to said load of the displaceable element with respect to said loadable part, one of said elements having means associated therewith for connection to a recording device. The device can be employed to operate by twisting of the bar element when the mechanism is loaded to predetermined limits of maximum and minimum permitted load.

The twistable portion of the bar element is preferably provided with a projection which may be radial engaging in a slot or the like in the displaceable element. The control device preferably comprises an elongated torsion bar fixed against axial rotation towards one end thereof, a connection towards the other end of the torsion bar between the torsion bar and a displaceable element shaped to form a driving member of a mechanism to be controlled, the shape of the torsion bar and the connection between the torsion bar and the displaceable element being such that when the mechanism is loaded within a predetermined limit it will hold the displaceable member against displacement, but when the load on the mechanism reaches the predetermined limit the torsion bar will twist, the torsion bar being provided with means for association with a recording device responsive to twisting of the torsion bar.

The recording device may be operatively connected to means for imparting the drive to the driven member, said means being associated with a second control device so that when the displaceable element reaches the limit of its predetermined movement the torque imparted to the driving member is varied or reduced to zero. The movement of the displaceable member may be in either direction, the torque imparted to the driving member being varied, reduced to zero or reversed so that the load on the gear mechanism is reduced within predetermined limit or eliminated.

The displaceable element or the bar element may be provided with stop means to limit its movement, or be provided with limits in opposite senses so that the drive is alternately reversed from one direction to another to cause oscillation of a member to be controlled.

The object of the present invention is to provide a drive transmission from a prime mover to a driven member, in this case a spiral conveyor, which incorporates a control device operating to adjust automatically, to within predetermined upper and lower limits, the torque imparted to the driven member by the prime mover.

According to the present invention a conveyor apparatus, for pulverulent material suspended in liquid, comprises a tubular conveyor casing, a rotatable spiral conveyor member within the casing, a hopper supplying the material to be conveyed to one end of the conveyor member within the casing, a variable outlet orifice in the region of the other end of the casing, means operable to vary the size of said orifice, a drive member for rotating the conveyor member in the casing, and associated with said elements a control device comprising at least one twistable bar element having a portion fixable against rotation with respect to one of said members about its longitudinal axis and spaced along said axis from the fixed portion, a portion operatively connected to a displaceable element capable of relative movement with respect to the other of said members, the bar element being calibrated to restrain movement of the displaceable element when said members are loaded within at least one predetermined limit, but when said load exceeds said limit will twist thereby permitting relative movement of one of said members with respect to the other member in direct proportion to said excess load, and means associated with said displaceable element and said orifice varying means so as to vary the size of said orifice to cause reduction of the load on said members to within said predetermined limit.

Preferably said bar element is calibrated to restrain movement of said displaceable element when said members are loaded within upper and lower predetermined limits and to twist when the load on said members respectively falls below or exceeds said limits to cause variation of the size of said orifice and maintain the load on said members within said limits.

The orifice in the casing in a preferred construction is formed by an inflatable annular tube secured to the open delivery end of the casing, a pump operable to pump fluid into said tube and to release the fluid from said tube, a control valve between said pump and said tube and responsive to movement of the displaceable element so as to vary the size of the orifice by controlling the amount of fluid in said tube.

In order that the invention may be more clearly understood some constructions in accordance therewith will now be described, by way of example, with reference to the accompanying drawings, in which.

In the drawings the same references are used to designate the same parts.

Figure 1:
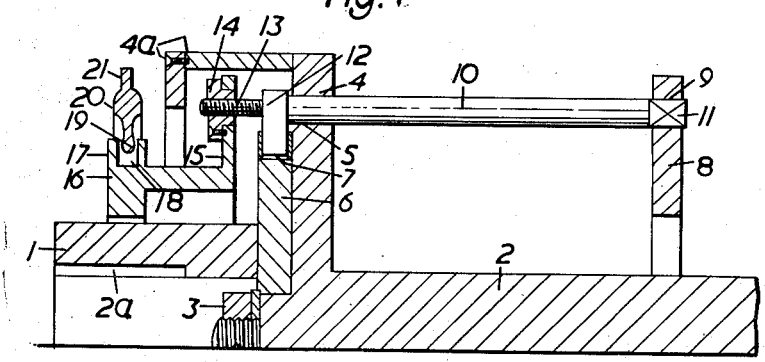
FIGURE 1 is a partial cross-section of a transmission drive.

The drive transmission shown in FIGURE 1 comprises a driving member in the form of a shaft 1 and a driven member shown as a shaft 2 coupled together as at 3 in a conventional manner so that one can rotate relative to the other. The shaft 2 is preferably short as shown and has a keyway 2a for connection to the output shaft of the prime mover. The shaft 2 carries a flange 4 having a number of circular bores 5 therein of which one is shown while the shaft 1 has an annular flange 6 of smaller diameter than the flange 4 and having therein one radial slot 7 in radial alignment with each bore 5 in the flange 4. A circular plate 8 is fixed to the shaft 2 and has a number of holes 9 each aligned axially with one of the bores 5 in the flange 4, each hole 9 having a non-circular cross-section, for example, square.

A number of torsion bars, of which one is shown at 10 in FIGURE 1, are provided each with a squared end 11 fixed in one of the holes 9 and passing freely through the aligned bores 5 of the flange 4; each bar 10 carries a radial projection 12 near its free end, said projection engaging in one of the slots 7 in the flange 6.

It will thus be seen that when a drive is imparted to the shaft 1 this driving torque will be transmitted to the shaft 2 through the slots 7, the projections 12, the bars 10 and the flange 4. The bar 10 is of a material and is so dimensioned to have a predetermined torque resistance so that if the torque imparted to the shaft 1 by the prime mover is within predetermined upper and lower limits the bar 10 will remain rigid and the shaft 2 will be rotated at the same speed as the shaft 1. Should, however, the load on the transmission exceed or fall below the upper or lower predetermined limits respectively for which the torque resistance of the bar 10 is selected the bar will twist in its bore 5, while its other end remains fixed in its hole 9, causing a relative rotational movement between the shafts 1 and 2.

The free end of the bar 10 is provided with a quick start thread 13 meshing with a threaded member 14 secured to a flange 15 on a control actuating member 16 freely surrounding the shaft 1. The end of the member 16 remote from the flange 15 is provided with a radially slotted ring 17 and engaged in the slot 18 thereof is the nose 19 of a trunnion 20 fixed with respect to the bearings (not shown) in which the shaft rotates. The trunnion has a projection 21 which can be connected to any means movable by a displacement of the trunnion. Should the bar 10 twist as aforesaid the member 16 will be moved axially with respect to the shaft 1 by the quick-start thread 13 while rotating with the shaft 2, and this axial movement of the member 16 will cause the projection 21 of the trunnion to be displaced and thus move a lever or other device operatively connected to means for varying the load on the transmission. Such variation may vary the torque transmitted by the driven member, or vary the load on or the output of the device, apparatus or the like driven by the shaft 2. A cover 4a is attached to the member 4.

Figure 2:
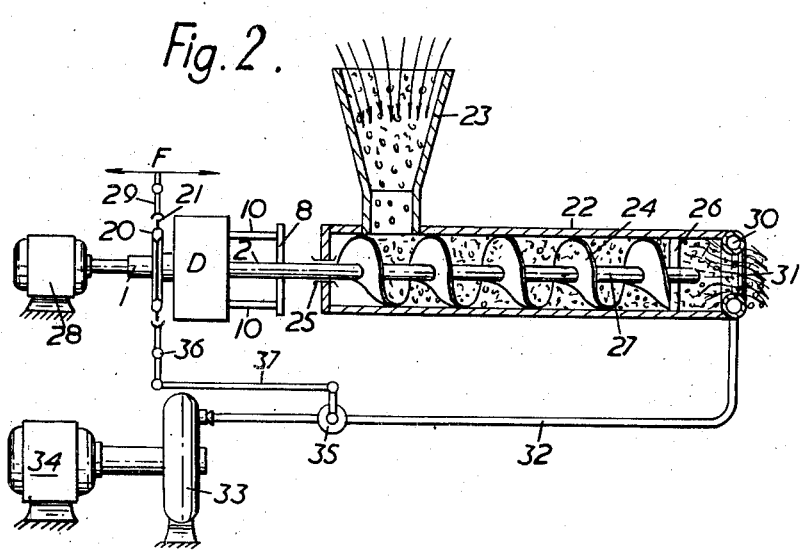
FIGURE 2 is a diagrammatic side view partly in cross-section of a pulverulent spiral conveyor feed embodying the drive transmission shown in FIGURE 1.

Referring to FIGURE 2 the conveyor comprises a conveyor casing 22 to which pulverulent material carried in water is fed through a hopper 23; rotating in the casing 22 is an Archimedean spiral conveyor 24 supported in bearings 25 at one end of the casing and in a spider 26 towards the delivery end of the casing. The shaft 27 of the conveyor is connected to or forms the driven shaft 2 of a drive transmission (D) of the kind shown in FIGURE 1, the shaft 1 of which is connected to a prime mover such as an electric motor 28. The projection 21 of the trunnion 16 of the drive transmission is connected to a lever 29 pivoted to the frame of the apparatus so that its outer end, when the trunnion 16 is axially displaced, will traverse an arc in the direction of the arrows F, FIGURE 2, and this movement may vary the current supplied to the motor 28 to vary the torque imparted to the shaft 27.

The outlet orifice of the conveyor casing 22 is provided by an annular flexible inflatable ring 30, of rubber for example. It will be seen that by inflating the ring 30, or deflating it, the diameter of the orifice 31 therethrough can be varied.

The ring 30 is connected by a pressure line 32 to a pump 33 driven by a prime mover such as an electric motor 34. In the line 32 is a valve 35 connected to the trunnion 16 as by a pivoted lever 36 and a rod 37 so that axial movement of the trunnion will cause inflation or deflation of the ring 30 and thus affect the output of the conveyor.

Although the drive transmission of FIGURE 1 has been described with particular reference in FIGURE 2 to a spiral conveyor it will be understood that it can be applied to any drive shaft or drive transmission in which the variation of the load on the driving or driven shafts or the output of the driven apparatus or the like needs continual adjustment automatically: for example, the drive transmission can be used in the drive of crushing mill rollers, where the pressure between the crushing rollers sometimes rises to the breaking point of the rollers, the torsional load on the drive shaft of the rollers increasing at the same time by employment of a drive transmission of the invention in the drive shaft of the roller or rollers, the rising torsional load in the shaft will result in the drive from the prime mover being cut out before the pressure between the rollers reaches the breaking point.

We claim:

1. A conveyor apparatus for pulverulent material suspended in liquid, said apparatus comprising a tubular conveyor casing, a rotatable spiral conveyor member within the casing, a hopper supplying the material to be conveyed to one end of the conveyor member within the casing, a variable outlet orifice in the region of the other end of the casing, means operable to vary the size of said orifice, a drive member for rotating the conveyor member in the casing, a control device comprising at least one twistable bar element having a portion fixed to one of said members and held against twisting about its longitudinal axis and, spaced along said axis from the fixed portion, a portion operatively connected to the other of said members and to a displaceable element capable of relative movement with respect to the other of said members, the bar element being calibrated to restrain movement of the displaceable element when said members are loaded within at least one predetermined limit, but when said load exceeds said limit will twist thereby permitting relative angular movement of one of said members with respect to the other member in direct proportion to said excess load, and means associated with said displaceable element and said orifice varying means so as to vary the size of said orifice to cause reduction of the load on said members to within said predetermined limit.

2. A conveyor apparatus according to claim 1, wherein said bar element is calibrated to restrain movement of said displaceable element when said members are loaded within upper and lower predetermined limits and to twist when the load on said members respectively falls below or exceeds said limits to cause variation of the size of said orifice and maintain the load on said members within said limits.

3. A conveyor apparatus according to claim 1 wherein the twistable portion of the bar element is provided with a projection engaging in a slot in said other member.

4. A conveyor apparatus according to claim 1 wherein the said orifice is formed by an inflatable annular tube secured to the open delivery end of the casing, a pump operable to pump fluid into said tube and to release the fluid from said tube, a control valve between said pump and said tube and responsive to movement of the displaceable element so as to vary the size of the orifice by controlling the amount of fluid in said tube.

References Cited in the file of this patent

UNITED STATES PATENTS

| | | |
|---|---|---|
| 2,232,545 | Lum | Feb. 18, 1941 |
| 2,554,796 | Runninger | May 29, 1951 |